United States Patent [19]

Baker

[11] 4,352,463
[45] Oct. 5, 1982

[54] MOTORIZED COMBINATION WET AND DRY LAWN TREATMENT SPREADER

[75] Inventor: Douglas W. Baker, Kettering, Ohio

[73] Assignee: Leisure Lawn, Inc., Dayton, Ohio

[21] Appl. No.: 177,109

[22] Filed: Aug. 11, 1980

Related U.S. Application Data

[63] Continuation-in-part of Ser. No. 4,585, Jan. 18, 1979, Pat. No. 4,234,131.

[51] Int. Cl.³ .............................................. A01C 15/00
[52] U.S. Cl. ..................................... 239/663; 180/72; 239/684; 239/197; 239/289
[58] Field of Search ........................ 239/195, 197–199, 239/146, 155, 156, 289, 650, 662, 663, 668, 684, 685, 687; 414/537; 222/608, 626; 180/70 R, 72

[56] References Cited

U.S. PATENT DOCUMENTS

| | | | |
|---|---|---|---|
| 2,315,085 | 3/1943 | Churchward | 239/197 X |
| 3,352,440 | 11/1967 | Wilson | 414/537 |
| 3,401,890 | 9/1968 | Middlesworth | 239/662 X |
| 3,523,648 | 8/1970 | Garber | 239/687 X |
| 4,032,074 | 6/1977 | Amerine | 239/685 |
| 4,078,678 | 3/1978 | Tordella | 414/537 |

FOREIGN PATENT DOCUMENTS 1131283 10/1968 United Kingdom ................ 239/684

Primary Examiner—Andres Kashnikow
Attorney, Agent, or Firm—Becker & Becker, Inc.

[57] ABSTRACT

A combination wet and dry lawn treatment spreader for wet and dry materials to be selectively distributed simultaneously and uniformly over a lawn area has a hopper that is mounted upon a base frame structure in combination with four wheels and a fuel powered motor therewith. Only the two front wheels are used for driving purposes. An impeller blade and wet spray arrangement is combined with the motor used simultaneously for front wheel drive connection on the spreader. The impeller blade of the fertilizer spreader distributes fertilizer falling onto the spinning impeller blade at a location below that where simultaneously wet lawn treatment material is sprayed in a fan-like configuration located horizontally in a plane located above a plane in which the impeller blade rotates. A storage area is accessible by ramp tracks movable in and out of a platform recess of a truck body van; also, the truck body van has a fluid tank, hose and reel for winding-up and extension to a handle on the spreader as well as a motor-pump arrangement installed for use in the combination spreader.

8 Claims, 15 Drawing Figures

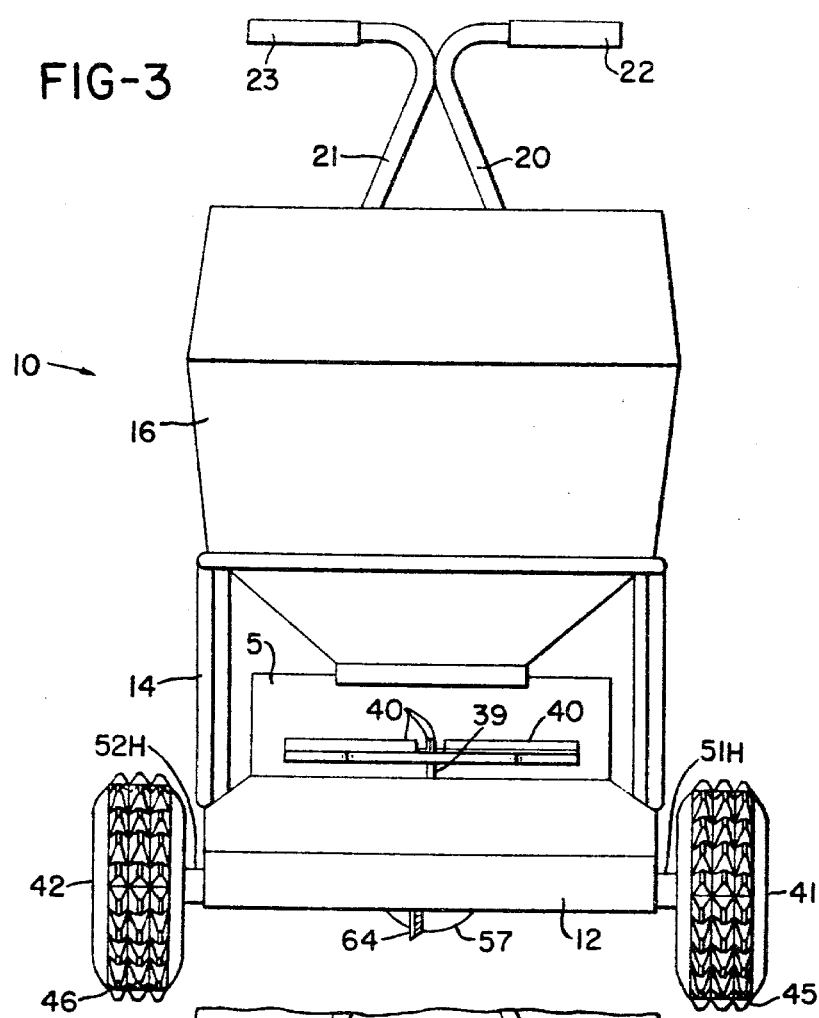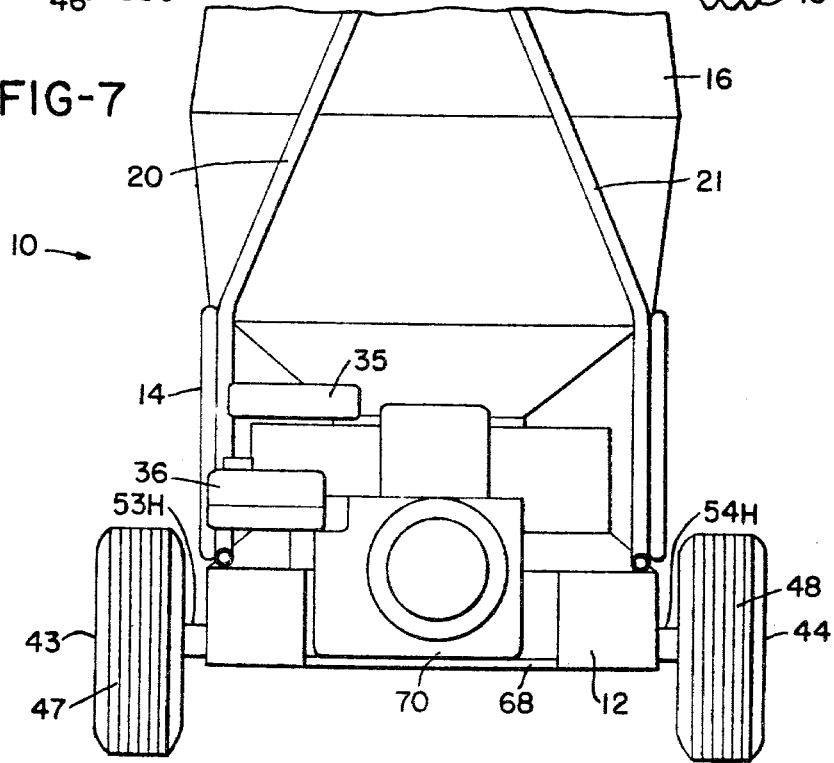

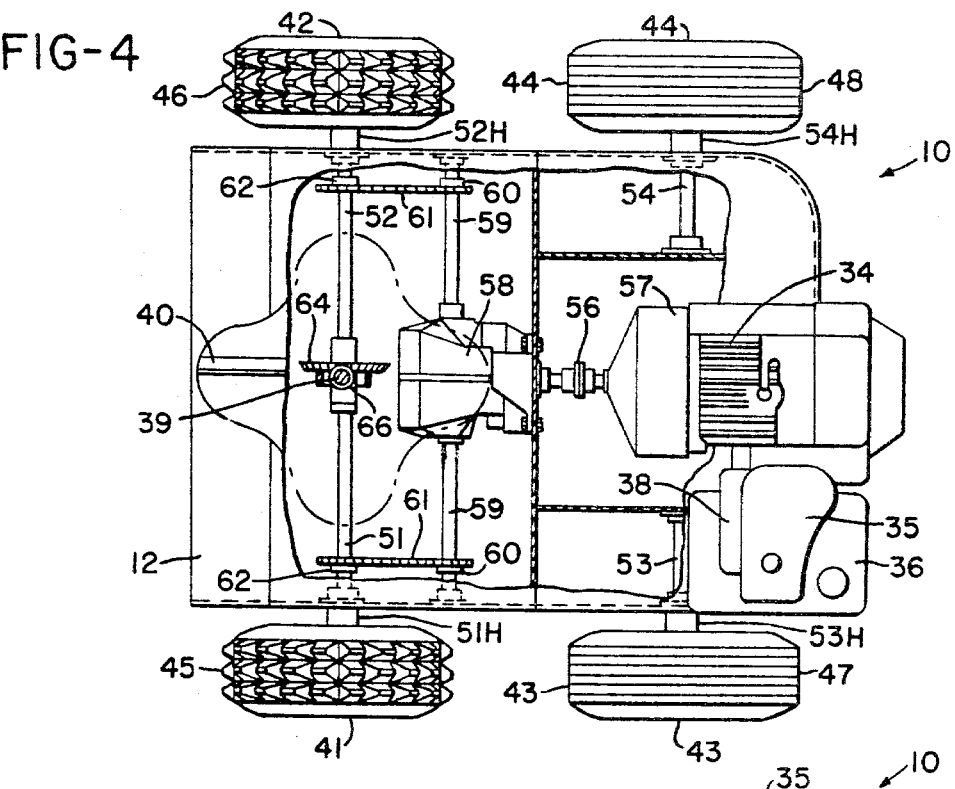
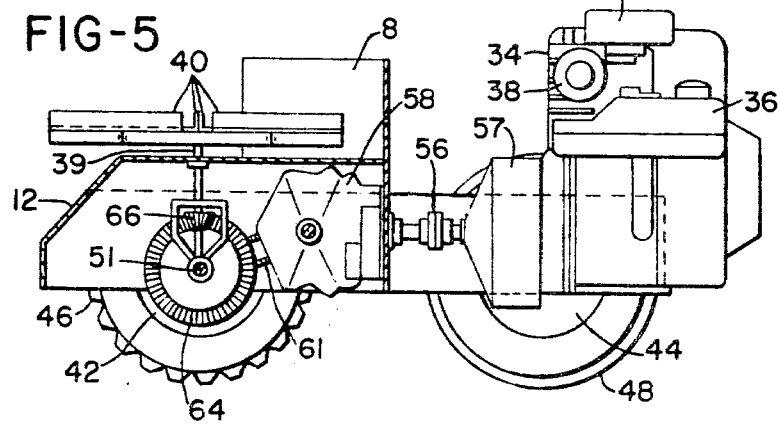
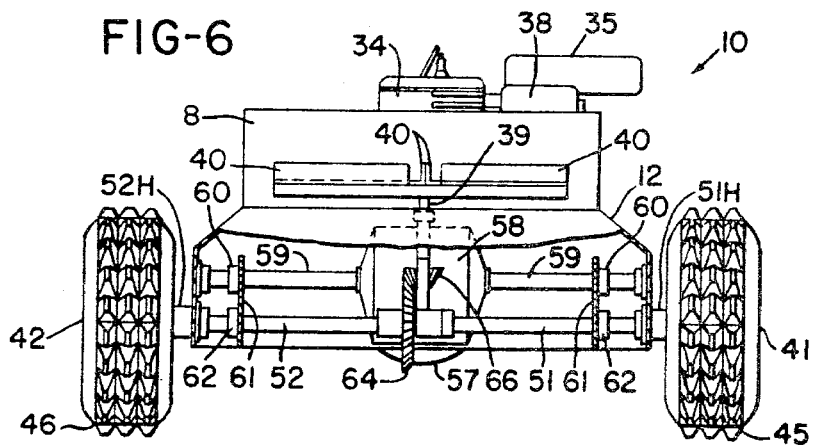

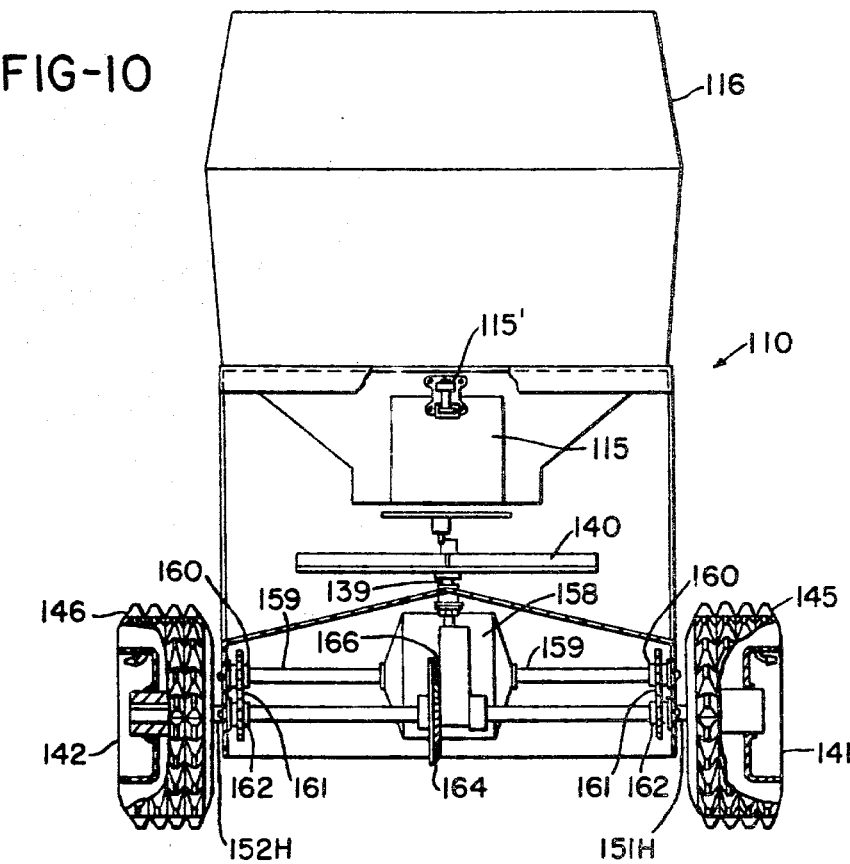
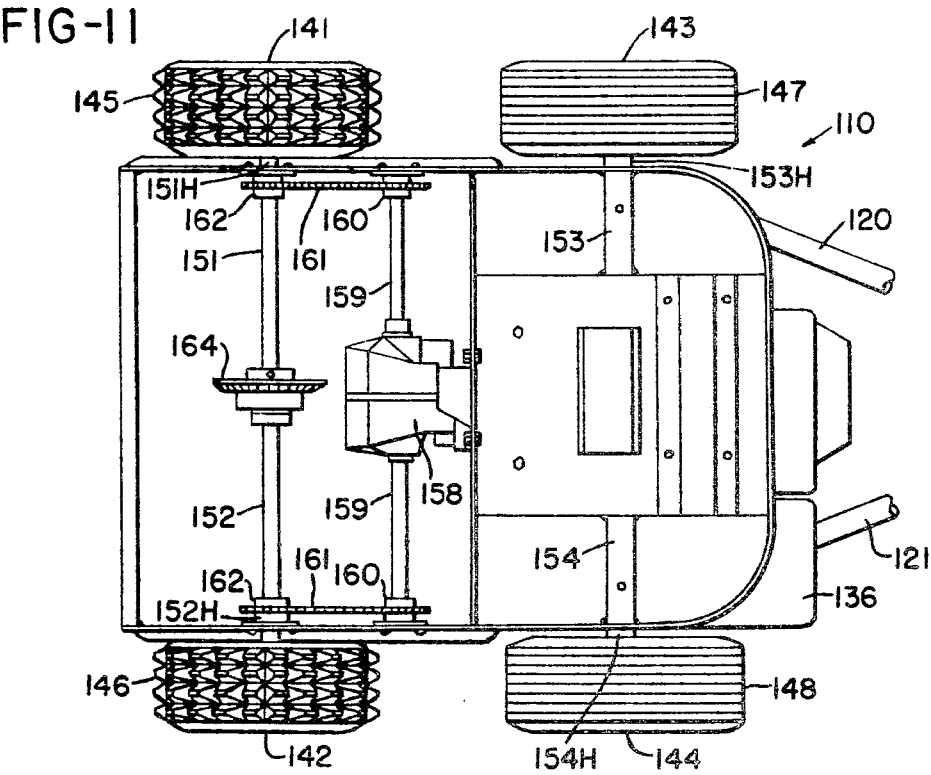

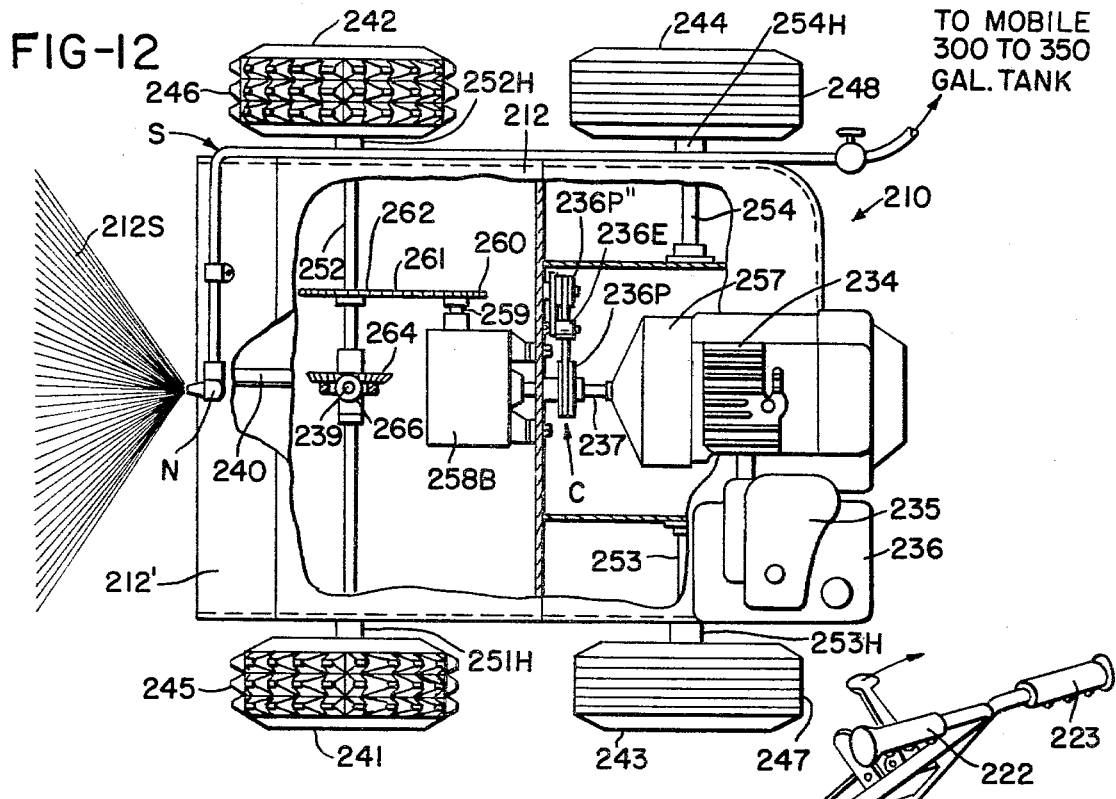
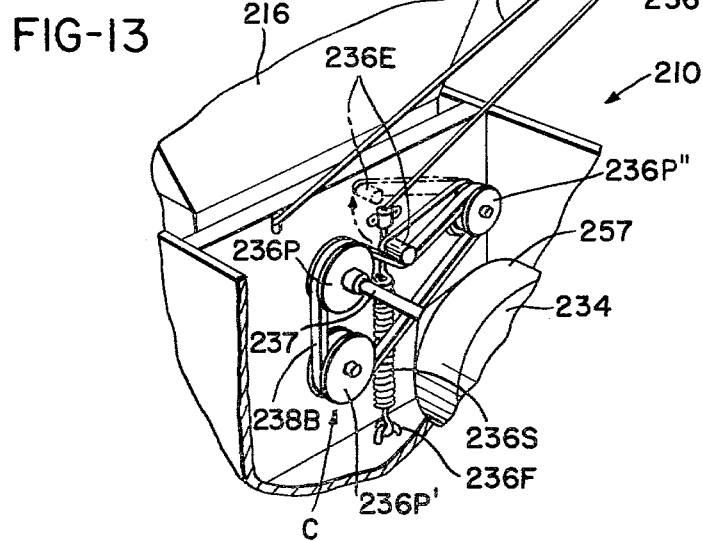

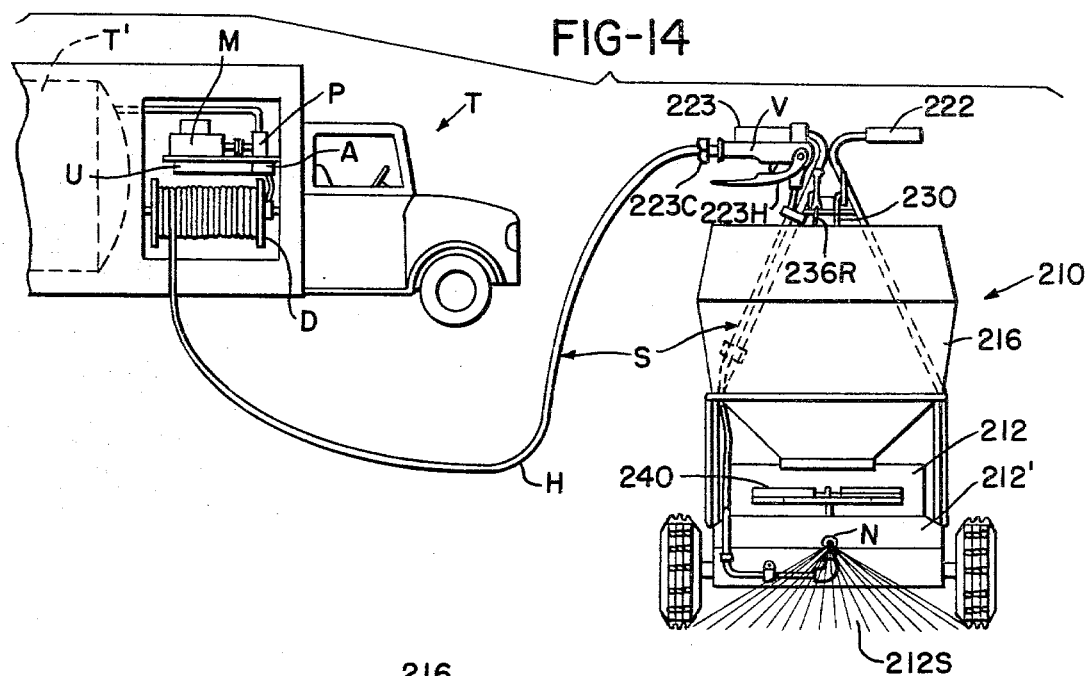
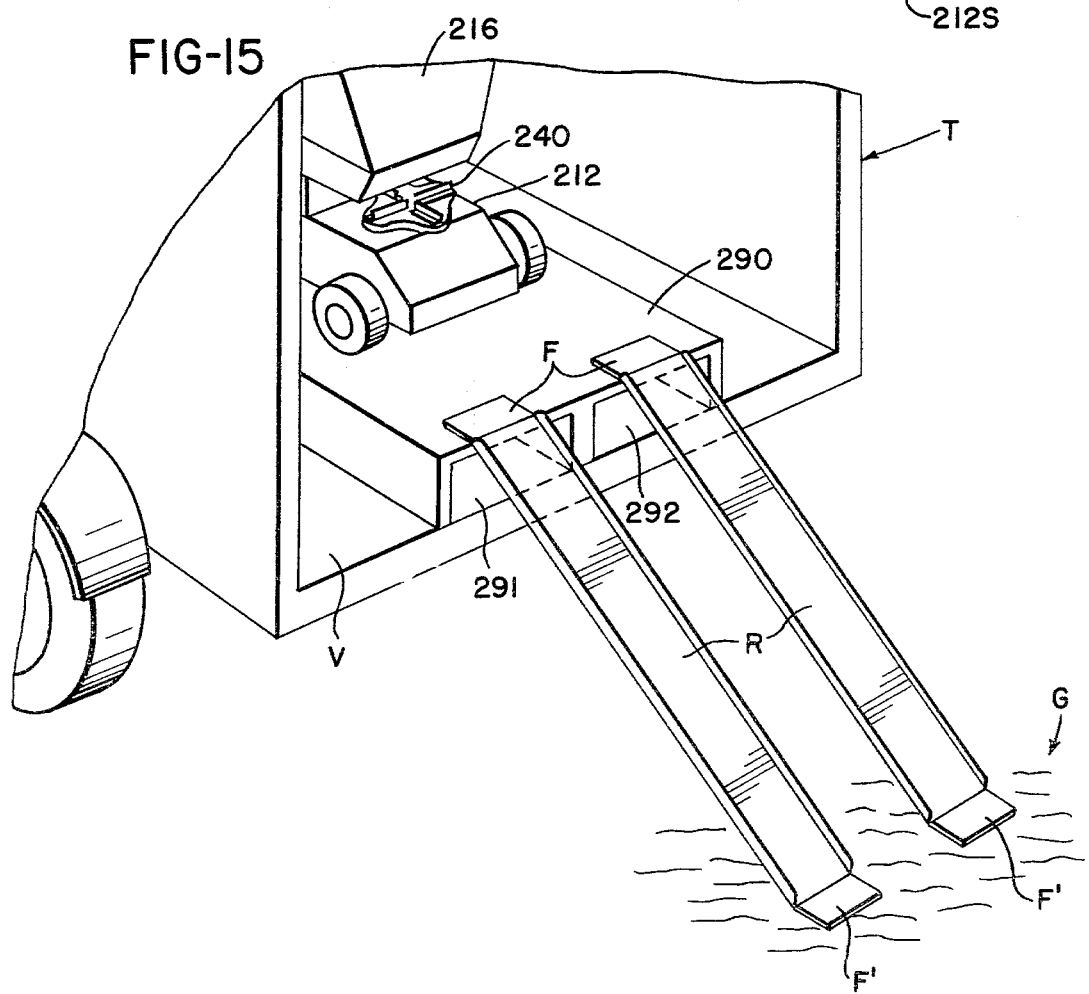

MOTORIZED COMBINATION WET AND DRY LAWN TREATMENT SPREADER

This is a continuation-in-part of co-pending application Ser. No. 4,585—Baker filed Jan. 18, 1979, now U.S. Pat. No. 4,234,131—Baker dated Nov. 18, 1980.

BACKGROUND OF THE INVENTION

1. Field of the Invention

The present invention relates to apparatus used by lawn service companies and individuals for lawn care purposes. The motorized fertilizer spreader is capable of pulling up to sixty pounds weight where more strength is needed otherwise to push spreaders.

2. Description of the Prior Art

A motorized impeller blade has been provided on spreaders. However, in view of younger help employed by lawn service companies, more strength is needed to propel and push spreaders over lawn area for uniform distribution of fertilizer. Such uniform distribution is not always certain if human energy is dissipated and a problem of tiring sets in for the individual trying to carry out the fertilizer spreading operation.

SUMMARY OF THE INVENTION

Main Features

The present invention seeks to overcome the aforementioned problem. A fertilizer spreader with a revolving impeller blade at least partially within confines of an impeller shield below a fertilizer hopper is mounted upon a substantially rectangular base frame structure to journal four wheels rotatably therewith; a gasoline-powered engine with an elevated gas tank of up to one-half gallon capacity and an elevated foam-type air cleaner is mounted securely on an engine tray at the rear of the frame structure in a compact recess location underneath a handle behind and below the standard fiberglass hopper. The impeller blade below the standard fiberglass hopper is gear driven by way of a direct coupling drive which simultaneously turns a shaft extending axially in opposite lateral directions. The shaft is driven with a bevel gear drive for the rotatable impeller blade mounted on a shaft journalled vertically by the base frame structure. A chain meshes with the sprocket gear on the shaft and is driven by a sprocket keyed to a projecting end of a motor shaft. The chain drivingly engages the sprocket connected to axle means for journalling the front pair of wheel positively and uniformly driven thereby. A rod and lever position engagement between the handle and motor driven impeller and front wheel drive is combined with timing and revolution interconnection to assure against undesired fertilizer spreading except when positively actuated for wide range spreading of up to 60 pounds of fertilizer material from the lightweight standard fiberglass hopper. The impeller blade of the fertilizer spreader distributes fertilizer falling onto the spinning impeller blade at a location below that where simultaneously wet lawn treatment material is sprayed in a fan-like configuration located horizontally in a plane located above a plane in which the impeller blade rotates. A storage area is accessible by ramp tracks movable in and out of a platform recess of a truck body van; also, the truck body van has a fluid tank, hose and reel for winding-up and extension to a handle on the spreader as well as a motor-pump arrangement installed for use in the combination spreader.

An object of the present invention is to combine front wheel drive and motorized impeller blade operation with positive rod and lever control of a large capacity fertilizer spreader having a hopper, handle and four wheels as well as having a liquid spray conduit and nozzle located above the spinning impeller blade for simultaneous lawn treatment application.

Other objects, features, and advantages of the invention will become more apparent with reference to the succeeding detailed description thereof and to the drawings illustrating preferred embodiments thereof.

BRIEF DESCRIPTION OF THE DRAWINGS

FIG. 3 is a front elevational view of the spreader of FIGS. 1 and 2.

FIG. 4 is a partially sectioned plan view of the spreader having drive mechanism in accordance with the present invention.

FIG. 5 is a side view of the mechanism of FIG. 4.

FIG. 6 is an end elevational view of the mechanism of FIGS. 4 and 5.

FIG. 7 is a rear elevational view of the motorized spreader in accordance with the present invention.

FIGS. 8, 9, 10 and 11 show a further embodiment of a power lawn spreader in views corresponding to those of FIGS. 1, 2, 3 and 4 respectively.

FIG. 12 is a partially sectioned plan view of a spreader having driven mechanism further in accordance with the present invention.

FIG. 13 is a partially sectioned fragmentary perspective view showing a belt-clutch drive engagement and control arrangement further in accordance with the present invention.

FIG. 14 is a schematic illustration of a combination wet and dry spreader arrangement with mobile liquid storage, motorized pump as well as hose and reel mechanism provided in a trunk body van location in accordance with the present invention.

FIG. 15 is a fragmentary perspective view of a truck body van including a storage area to receive slide-away ramps for loading and unloading the combination wet and dry spreader in accordance with the present invention.

DETAILED DESCRIPTION FOR PREFERRED EMBODIMENTS

Figure 1:
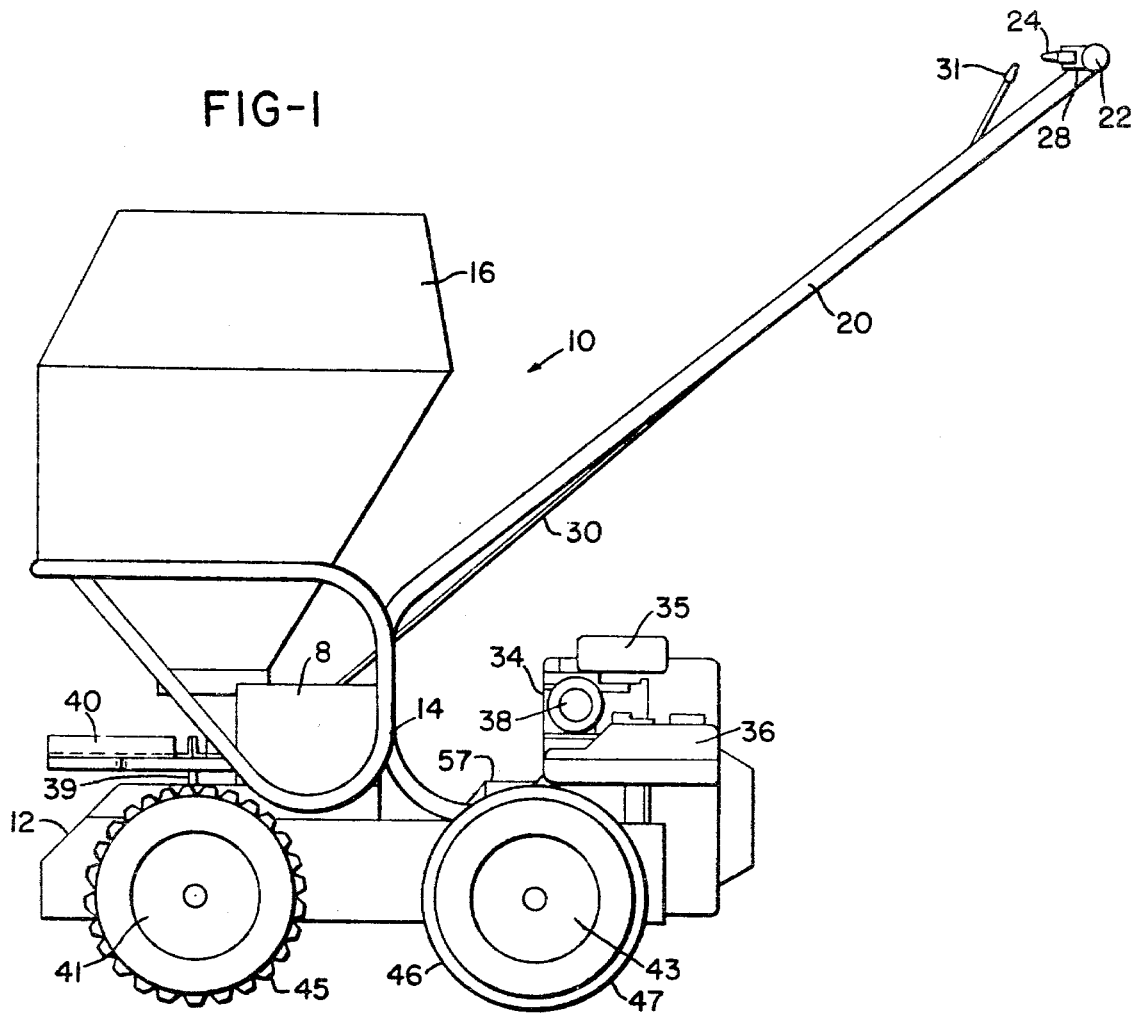
FIG. 1 is a side elevational view of a motorized dry fertilizer spreader in accordance with the present invention.
Figure 2:
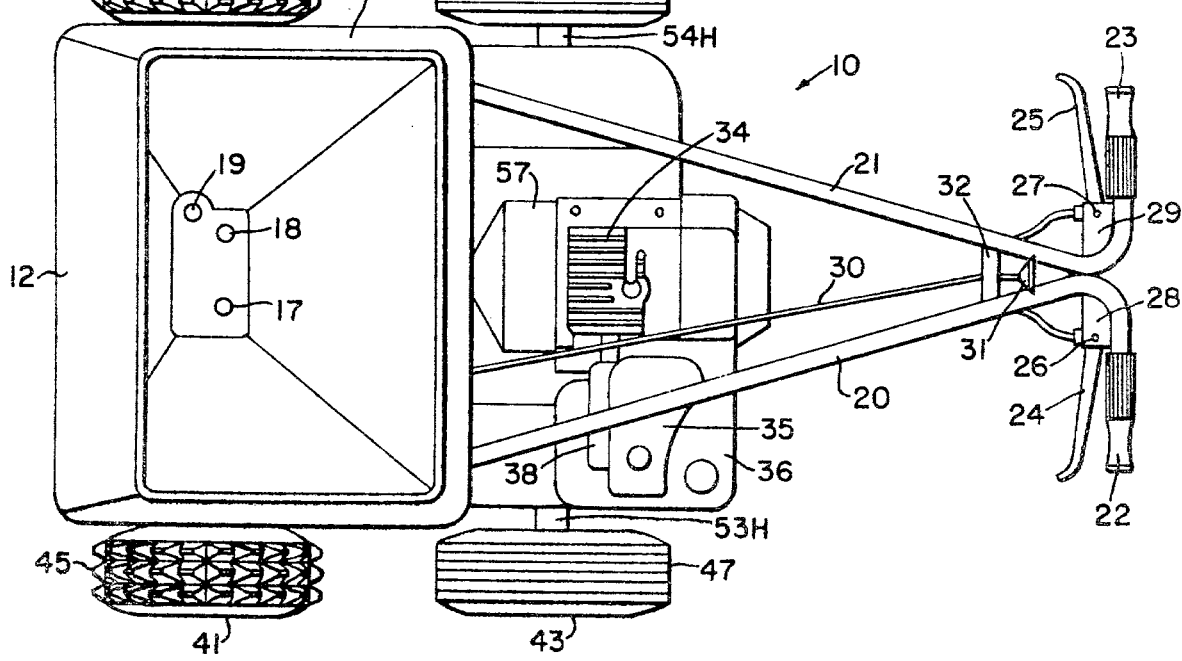
FIG. 2 is a top plan view of the spreader of FIG. 1.

FIGS. 1 and 2 and 3 show a motorized fertilizer spreader generally indicated by reference numeral 10 including a base frame structure 12 substantially rectangular in shape with downwardly extending flanges that surround drive mechanism shown by FIGS. 4, 5 and 6. A tubular support 14 is suitably secured by welding or screws to the base frame structure 12. A light-weight fiberglass hopper 16 is suitably secured to the tubular support. This hopper 16 has three metering holes 17, 18 and 19 in the bottom thereof. The hopper 16 with the metering holes is commercially available as a Scott RX-7.

A tubular handle means 20, 21 is secured to the tubular support 14 by welding or screw fasteners. Handle grip portions 22, 23 are located laterally outwardly and substantially parallel to levers 24 and 25 pivoted by pins 26, 27 through webs 28, 29. A rod 30 with an enlarged knob 31 is guided by a cross-piece 32 interconnecting the tubular handle means 20, 21. The lever 25 and rod 30 are suitably connected with means to control (1) the engagement of the transmission and (2) the opening of the holes in the bottom of the hopper 16. A gasoline engine 34 is commercially available from Briggs and Stratton Corp., Milwaukee, Wis. 53201 and is set at a constant R.P.M. via a screw type throttle (standard engine equipment). The engine is a Series 60100 gasoline motor rated at 2 HP at 3600 R.P.M. An oil-form air cleaner 35 and a gas tank 36 having at least one-half gallon capacity are provided with the engine 34 having an exhaust muffler 38.

A vertical shaft 39 is suitably journalled by a bearing on the base frame structure 12. An impeller blade 40 is carried and secure by a set screw to an upper end of the shaft 39. The impeller blade 40 is located below the holes 17, 18 and 19 in the bottom of the hopper 16. Past rotation of the shaft 39 with the impeller blade 40 on its end results in extra wide pattern dispersal of fertilizer flowing through the metering holes 17, 18 and 19 in a well known manner. The hopper 16 is capable of holding up to 60 pounds of dry fertilizer. A shield 8 is located to one side of the impeller blade 40 and guards against any fertilizer being dispersed by centrifugal force against the engine 34.

Four wheels 41, 42, 43 and 44 having tires 45, 46 with stubby wide stread lug configuration for good traction on the front and tires 47, 48 with a more narrow linear tread configuration on the rear are provided to support the dry fertilizer spreader capable of being loaded with up to 60 pounds of dry fertilizer.

FIG. 4 shows the axles or shafts 51, 52, 53 and 54 with hubs 51H, 52H, 53H, and 54H having the wheels 41, 42, 43 and 44 rotatably journalled relative to the base frame structure in a suitable manner. A coupling 56 connects a gear reducer 57 adjoining the engine 34 with a transmission 58. Opposite output shafts 59 from the transmission 58 have sprocket gears 60 fixed thereon. These sprocket gears 60 mesh with parallel chains 61 which drivingly and positively engage further sprocket gears 62 that are fixed to the shafts 51, 52 to transmit propelling force to the front wheels 41, 42. A steel bevel gear 64 located centrally of the shafts 51, 52 simultaneously-transmits operating force to another steel bevel gear 66 (each 12 pitch) in mesh therewith. The bevel gear 66 is positively drivingly connected to the vertical shaft 39 which carries the impeller blade 40 in a timing and revolution interconnection between the front wheel drive and the impeller blade 40.

FIG. 7 shows an engine tray 68 joined to the base frame structure 12 and forming a compact recess at a lower rear located to assure low center of gravity of mass of the engine 14 to facilitate motorized spreader operation along embankments.

No basis for comparison exists as to a self-propelled lawn mower or snow thrower (blower). The problem of individual fatigue precluding uniform fertilizer spreader is unique. The novel combination of features of the present invention solves a problem existing for lawn services companies. Optionally a lightweight belly pan 70 can be provided to one side of the engine tray 68 also provision can be made for reverse functioning of the spreader. The shifting mechanism can include two lever positions.

There is also noted that the coupling engine, gear reduction, coupling, transmission as well as the sprocket and chain means are all suitably at the same level below the surface of the base frame structure. This further assures economical manufacture and compact arrangement of parts, together with the maintenance of a low center of gravity as mentioned previously in this description.

Also, between the engine 34 and transmission 58 there is a limited slip device or coupling 56 which transmits the torque transferred from the engine 34 to the transmission 58 and the drive train assembly including the gears, shafts and the like described in detail previously in this specification.

FIGS. 8, 9, 19 and 11 of the drawings show a further embodiment of a power lawn spreader corresponding to views of FIGS. 1, 2, 3 and 4 respectively. Reference numeral designations for similar parts are increased by 100 added to the original reference numeral designations.

Figure 9:
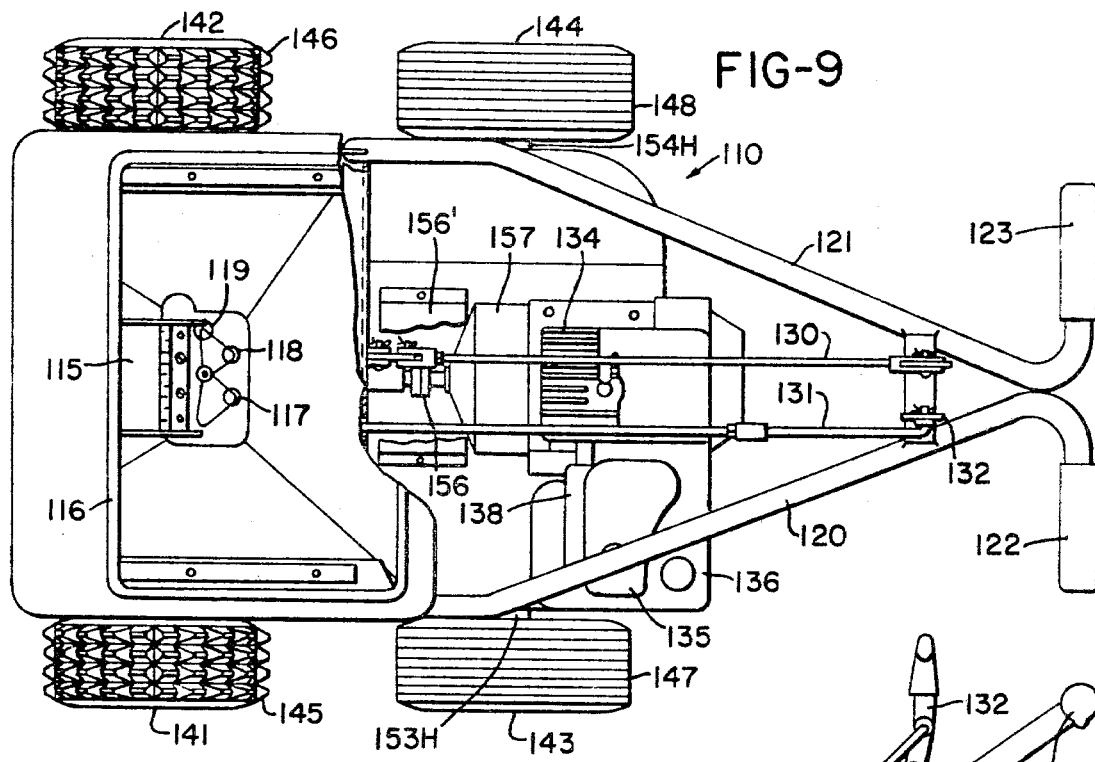
Figure 8:
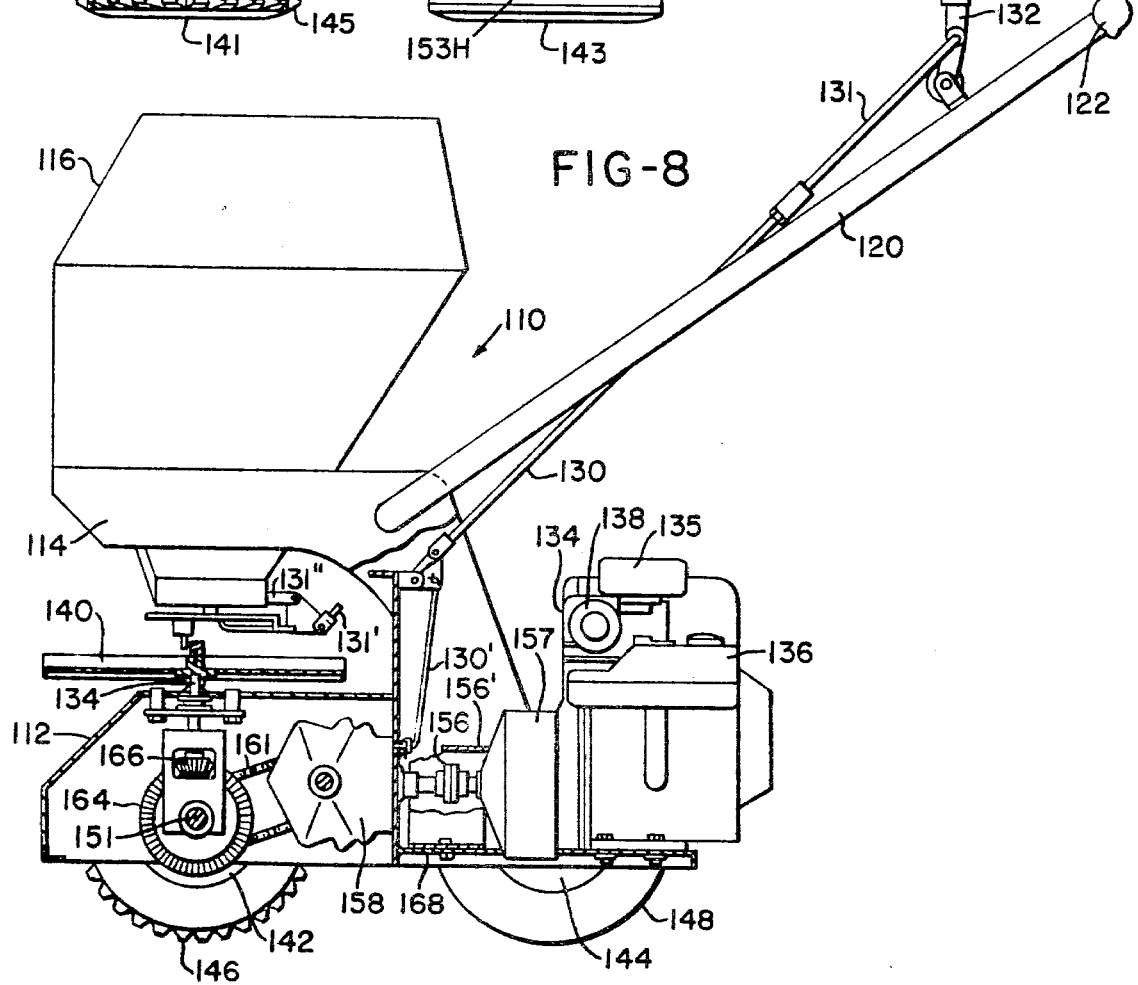

As clearly shown in FIGS. 8 and 9, there are two control rods 130 and 131 for actuation transmission 158 and hopper opening control. The rod 131 has a lower end 131' articulately joined in linkage to an arm 131" connected to a 3-hole disc means for controlling hopper opening and closing. A handle 132 is pivotally joined to the rod 131 at an upper end thereof readily accessible by an operating individual from the handles 122, 123. An articulated linkage 130' between the rod 130 and transmission 158 is also provided as best seen in FIG. 8. A welded sheet metal chassis and hood-like unitary hopper mounting 114 in the form of a solid steel stamping is provided differing from the tubing structure in FIG. 1. A tapered deck 112 is provided below the impeller blade 140 so that dry fertilizer will not collect or build up. A chute or door member 115 including a latch 115' are provided on the hopper 116 as shown in FIG. 10 to facilitate emptying of the hopper 116 or for changing dry fertilizer material therein. An annular shield 156' is bolted to a chassis platform or tray portion 168 and surrounds the limited slip device or coupling 156.

FIGS. 12, 13 and 14 illustrates another embodiment of spreader 210 having features in accordance with the present invention. There has been found that elimination of one axle drive connection and cost thereof resulting in the use of only one drive chain 261 instead of two drive chains not only saves cost but also avoids bridging or parallel power transfer. Also, the exclusive front wheel drive allows pivoting or tilting on the back wheels for a temporary stop or turn without motor power shut off. FIG. 12 illustrates a view similar to that of FIG. 4 and only one drive chain 261 is connected between a sprocket 260 driven from a gear box 258 instead of a transmission relative to a sprocket 262 on front wheel shaft 252 having a bevel gear 264 thereon in mesh with a bevel gear 266 of a vertical shaft 239. Reference numeral designations for similar parts are increased by 200 added to original reference numeral designations.

Also the perspective view of FIG. 13 illustrates a motor 234 having a pulley 236P on the shaft 237 extending outwardly to one side of the six-to-one gear reducer 257 with the 238B of motor 234. Only a belt 238B of clutch-coupling arrangement C is used rather than a torque converter and coupling, as well as the transmission engagement; also in this modification for power transfer with the belt 238B of the clutch-coupling arrangement C, a gear box 258B is used which in turn has a shaft 259 with a sprocket 260 thereon propelling a single drive chain 261.

A further pulley 236P' along with a third pulley 236P" can be suitably mounted on rotatably journalled shafts. The three pulleys 236P, 236P' and 236P" have the belt 236B looped therearound as shown in FIG. 13. A lever 236L is pivotally mounted to swing about an axis of the shaft of one pulley 236P". A skate-board wheel or lateral roller extension 236E at the free end of the lever is biased by a tension coil spring 236S anchored or hooked at a lower end to the U-shaped bracket or fastener 236F; the extension 236E urges the belt 238B into a taut driving engagement with the three pulleys when a handle-mounted control cable or rod 236R is in an "on" position for power transfer from the motor and gear box by way of the belt clutch-coupling arrangement C. A rod 230 extends along the handle to actuate opening and closing components for the hopper.

There is to be understood that a change in drive ratio with this embodiment is accomplished by a change in the number of teeth on the primary sprocket 260, which is readily removable from a keyway on the shaft 259 by loosening a set screw or other fastener in a well-known manner. The result is a constant drive that can be variable with a minimum change of parts, namely, a change of the primary sprocket 260 to have a change in the number of teeth. This constant drive, that can be variable by interchanging of the primary sprocket 260, is particularly advantageous to make provision for variable speed walking of an individual behind the spreader. Not all people walk at the same speed and therefore the primary sprocket can be interchanged to bring about a change in the number of teeth thereon engaging with the chain 261 having a belt 238B of the clutch-coupling arrangement C driving gear box 258B transmitting the power to the front axle only of the combination spreader of the present invention. For instance, a younger employee or man using the spreader may walk considerably faster than a semi-retired 65-year old man or operator, even though any and all individuals may be adversely affected by heat in the summer which makes the work of walking over a lawn with a spreader rather difficult, and since sometimes within a two or three year term or period of time involving several lawn treatment seasons, an operator will come to a conclusion that he can no longer stand the work physically. For this reason, the power driven and motorized combination fertilizer spreader of the present invention is especially advantageous in view of the case and comfort of being able to walk along with such a motorized spreader. Even women can operate the combination wet and dry motorized spreader five to seven miles per day comprising four to five hours of lawn time.

Generally, an operator also needs to guide the motorized spreader to provide overlapping passes and paths. The unibody chassis 212 results in a reduction of weight and also results in rigidity and sturdy platform support and mounting structure for the hopper of the spreader, as well as the motor 234 mounted thereon.

Also, there is convincing evidence that dry fertilizer spreading is better for lawn treatment both for purposes of weed control, insect control and fertilizing roots of plants. However, under limited circumstances, with broad-leaf weeds, it is sometimes advisable to supplement the dry fertilization and spreading with weed control in a liquid-form application of chemicals designed to be absorbed through the leaves of plants to the root system for eliminating such undesirable weeds and plants from an established lawn. Previously, it has been necessary under such circumstances to go over a lawn or weeded terrain twice by first having, for instance, a dry fertilizer or chemical application followed by a wet or liquid-form application of weed control. However, in accordance with a further improvement of the present invention, there is now provided a considerable advantage in a further combination feature.

The illustration of FIG. 14 shows a spray unit S with a nozzle N located in a lower forward portion of the unibody chassis 212 and directing a low fan-like spray pattern 212S ahead of the combination motorized spreader. Also illustrated in FIG. 14 is a 400 to 450 foot long hose H having a quick-disconnect connection 223C to a tanker truck T having a 350 gallon storage tank T' for water-chemical spray material by way of a pump P and gasoline engine or motor M driving the same, which can be parked on the street or in a driveway area adjoining the lawn being treated. The hose H can be of lightweight plastic material and can include a retractable hose reel or spring drum arrangement D or can be merely flipped from one side to another in a manner similar to an electric cord being moved from one side to another when cutting grass with an electric mower, for instance. The power-driven and motorized spreader in combination with the added feature of the wet spraying with liquid chemicals combined with dry material spreading simultaneously occurring over and above the liquid spray results in elimination of having to go over a lawn or area being treated twice. This means a savings in time and labor costs and also represents a savings in energy both for the operator and for the fuel of the motor used on the combination spreader device.

Furthermore, the power-driven and motorized spreader is especially well adapted for the wet spray application of liquid chemicals in combination with the dry fertilizer since the weight of the hose being dragged along with the spreader would be an excessive burden for an operator to overcome when pushing the spreader without any power assist, as made possible with the combination of the present invention. By being able to eliminate the need for going over a lawn or area being treated twice and accomplishing both wet and dry applications simultaneously and in combination with each other with only one walking or traversing of the lawn or area being treated, it is possible to save 30 to 40% of the time previously required in addition to accomplishing a savings in the energy of the man and the fuel needed for operating the motor. A 40 gallon mixing unit U along with an agitator A can be mounted near the motor M for thoroughly mixing fungicide and liquid weed control materials. The same motor M can be used for the pump P, agitator A, and turning the hose reel drum D.

Furthermore, there is to be understood that the spray unit S includes one or more fixed flow jet nozzles N arranged in a pattern in a lower front portion 212' of the motorized spreader combination and also a surge tank can be connected in line with the spray nozzle for purposes of controlling and regulating the rate of wet spray application. Additionally, if desired, a motor-driven pump for the spray nozzle application can also be connected in line between the hose and/or surge tank and spray nozzles. Under these circumstances, the gravity flow from the tanker truck can be supplemented by a motor-driven pump mounted on the unibody chassis of the combination spreader device in accordance with the present invention. A metering of the liquid spray is accomplished by controlling the pressure, volume and type of nozzle used for the spraying operation. Also a trigger valve V with an on-off handle 223H is provided to control on-off wet spray actuation selectively simultaneous with on-off movement of rod 230 to open and close dry fertilizer dispersal from the hopper.

There is apparent from the foregoing description that with the wet spray of a liquid application of chemicals being directed in a fan-like pattern forwardly at a location or level lower than the impeller plate 240 for the dry fertilizer or chemical application carried out simultaneously with the wet application through nozzle N, there results no interference in the application patterns of the wet application and dry application occurring simultaneously. The considerable advantage of this simultaneous wet and dry application in combination with the motorized spreader will be readily apparent for larger areas of treatment of grass on golf courses, as well as parks and landscaped grounds surrounding office buildings, commercial installations, universities, hospitals, and also Government buildings. The period of time previously needed in the spring for operators or men to get in shape after a winter period no longer is needed, and the strain of the work is eliminated for the operator, who can immediately start out when spring weather permits to proceed with combination dry and wet applications of chemicals for lawn treatment and weed control simultaneously by using the combination motorized and power-driven spreader device of the present invention. A quick-connect/quick-disconnect hose connection 223C can be used with the motorized combination spreader device additionally so that an operator can hook up the hose from the 300 to 350 gallon storage tank T' of the truck T quickly and also can release the hose H again from the combination spreader unit quickly, thus requiring only a minimum of time for setting up and leaving a particular treatment area thereby resulting in a further savings in cost, energy and time in going from one site to another for combination wet and dry chemical fertilizer and weed control application concurrently with a minimum of effort and cost. The hose is mounted on the top of the frame or chassis of the spreader to permit easy access thereto and inspection for possible leaks.

The dry application of fertilizer or weed control chemicals in the form of granules that drop to the soil surface utilizes the soil as a holding medium for a time-released system of root feeding, which is the most effective use of lawn fertilizer. Spray applications are selectively used in combination with the motorized spreader in a continuous or repetitive program during at least four seasons of the year, and the liquid spray applications can be limited in the combination application for coating a leaf surface as in the case of weed control, for instance during the warmer or hotter weather time periods when weeds grow more actively. Liquid fertilizers can be used to feed a plant through the leaf surface causing fast surge growth that fades out or is lost through evaporation, volatilization or removal of grass clippings. Also, some liquids can cause fertilizer burns during hot and/or dry weather and, for this reason, under these circumstances, the wet spray of liquid chemicals can be selectively eliminated when desired. A healthy lawn is actually an oxygen machine, helping to keep the air in the environment fresh and clean. The "dry fertilizer" method gets the important food and chemical applications to the root system of the lawn to build a hardy, green golf course-like lawn. The dry application in the spring can include chemical granules for time release resulting in pre-emergent crabgrass and foxtail application, whereas, the combination wet and dry applications are particularly advantageous in early summer and late fall for control of dandelion, broadleaf, weed as well as chinch bug and sod webworm control. A minimum storage area for the combination spreader apparatus is needed since a homeowner or place of business, for instance, need not worry about storing such a useful combination tool and materials, but rather the combination spreader apparatus is a compact unit providing a combination of wet and dry applications when desired and/or when necessary to provide corrective action for leaf and roof infestations, fungus and other lawn problems. Also gypsum in granular or powder form can be applied to clay soils as a natural soil conditioner that loosens tight clay soils to let air, water and fertilizer penetrate. Gypsum also adds nutrients, calcium and sulfur to the lawn. Also, liquid insecticide wet application can be made in combination with the dry fertilizer combination, and such insecticides are available for controlling grubs.

Finally, FIG. 15 illustrates a pair of aluminum ramps R having bent flange ends F and F' respectively that engage on the top surface of a platform 290 and the ground G. The platform 290 has storage recesses or compartments 291 and 292 into which the ramps R can be pushed for storage when the truck T goes from one job location to another. The combination wet and dry motorized spreader is loaded and unloaded relative to the truck body van V having space in which dry fertilizer bags are also transported in a location on either side of the combination spreader or in a location forward or in front thereof. Also, the combination wet and dry motorized spreader when left in gear stays on the truck without any danger of rolling off therefrom during transit if back door is left open.

It is, of course, to be understood that the present invention is, by no means, limited to the specific showing in the drawings, but also comprises any modifications within the scope of the appended claims.

What I claim is:

1. A spreader for application of both wet and dry lawn treatment material comprising in combination, a substantially rectangular base frame structure, a large capacity hopper with a bottom opening for passage of dry lawn treatment material, an engine carried at a rear location of said frame structure, a handle means with control means for the operation of the hopper, four wheels rotatably journalled with front and rear axle means on said frame structure, gear reduction means on one side of said engine, a belt-clutch coupling means suitably journalled to one side of said engine and gear reduction means, a power engagement control element extending along said handle means for on-off control of said belt-clutch coupling means, a first sprocket gear fixed on a shaft to which driving power is transmitted when said power engagement control element is actuated for "on" positioning, a second sprocket gear secured to the front axle means, a single chain drive means interconnecting said first and second sprockets, a wet treatment nozzle means and hose connection thereto mounted at least partially on said base frame structure in a location below and in front of said hopper, and a valve means mounted with said handle means for on-off control of wet treatment material to said hose and nozzle means for spraying thereof, said valve means having an on-off handle therewith adjoining said handle means, said valve means also having a quick disconnect hose connection therewith, and a hose means joined therewith between the spreader and a truck for wet and dry lawn treatment material.

2. A spreader in combination according to claim 1, in which said belt-clutch coupling means includes three pulleys having triangular spaced location in coplanar relationship to each other.

3. A spreader in combination according to claim 2, in which said belt-clutch coupling means includes lever at one end pivoted about axis of rotation of one of said pulleys, and a roller extension projecting laterally from another end of said lever for taut engagement of driving actuation of said belt-clutch coupling.

4. A spreader in combination according to claim 1, in which a reel and drum means are mounted on one side of the truck for the dispensing of wet treatment material therefrom to the combination wet and dry lawn treatment spreader exclusively power driven itself by said engine.

5. A spreader in combination according to claim 4 wherein a motor and pump driven thereby are mounted on the truck above said reel and drum means.

6. A spreader in combination according to claim 4 wherein a tank for storage of wet treatment material is mounted rearwardly from said reel and drum means.

7. A spreader in combination according to claim 1, wherein a platform and compartment means formed therebelow are mounted on the truck, and a pair of racks having angled-off flange ends are received in said compartment means when the spreader is in transit on said platform of the truck, said racks providing a ramp for loading and unloading the spreader on the truck, the spreader being held on the platform when gear engagement exists to prevent rolling off from the back of the truck.

8. A spreader in combination according to claim 7 in which said nozzle means provides a fan spray of wet treatment material in a arcuate segment horizontally below dispersal of dry treatment material thereabove though below the hopper opening.

* * * * *